G. W. FLEMING.

VALVE SPRING SUPPORT FOR VALVE GRINDING.

APPLICATION FILED MAR. 25, 1921.

Reissued June 20, 1922. 15,388.

Inventor
Glen W. Fleming

By Hull Brock & West
Attys.

UNITED STATES PATENT OFFICE.

GLEN W. FLEMING, OF CLEVELAND, OHIO.

VALVE-SPRING SUPPORT FOR VALVE GRINDING.

15,388. Specification of Reissued Letters Patent. Reissued June 20, 1922.

Original No. 1,360,515, dated November 30, 1920, Serial No. 345,059, filed December 15, 1919. Application for reissue filed March 25, 1921. Serial No. 455,589.

*To all whom it may concern:*

Be it known that I, GLEN W. FLEMING, a citizen of the United States, residing at Cleveland, in the county of Cuyahoga and State of Ohio, have invented certain new and useful Improvements in Valve-Spring Supports for Valve Grinding, of which the following is a specification.

My invention relates to improvements in valve spring supports for valve grinding, and more particularly to a temporary support for valve springs for supporting the latter when under compression and it is desired to relieve the valve stem seat and valve seat cotter pin for the detachment of the latter for valve grinding either in the cylinder or detachment and removal for grinding by a tool.

The primary object of the invention is to provide a generally improved temporary valve spring support which may be readily inserted in and removed from the valved portion of an ordinary engine cylinder as well as one which will be exceedingly simple in construction, cheap of manufacture and efficient in use.

A still further object is the provision of a temporary valve spring support provided with an opening and seat portion adapted to initially receive and support the valve stem and the spring seat or disk member of the valve, respectively, when such valve and valve spring have been elevated by the push rod through the medium of the cam and cam shaft, the improved support being of open formation to receive the adjacent abutting ends of the valve stem and push rod and to afford ready access to the valve seat cotter pin for the ready insertion or removal of the latter in the act of replacing or removing the valve in the valve grinding operation.

With the above mentioned and other ends in view, the invention consists in the novel construction, arrangement, and combination of parts, hereinafter described, illustrated in one of its embodiments in the accompanying drawings, and particularly pointed out in the appended claims.

Figure 1:
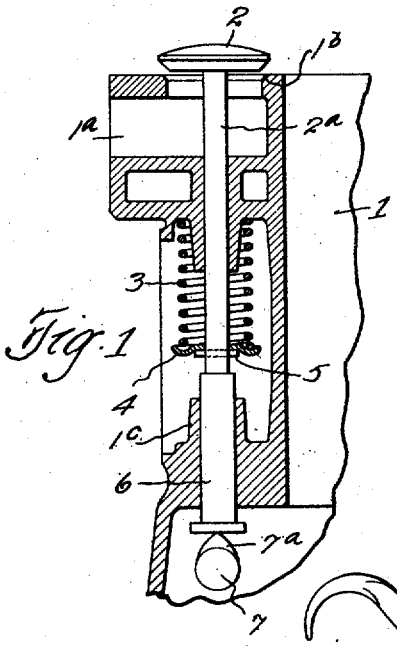

Referring to the drawings, forming a part of this specification, Fig. 1 is a sectional view of the valved portion of an ordinary engine cylinder with the valve spring and valve and its actuating mechanism in elevated or open position.

Figure 2:
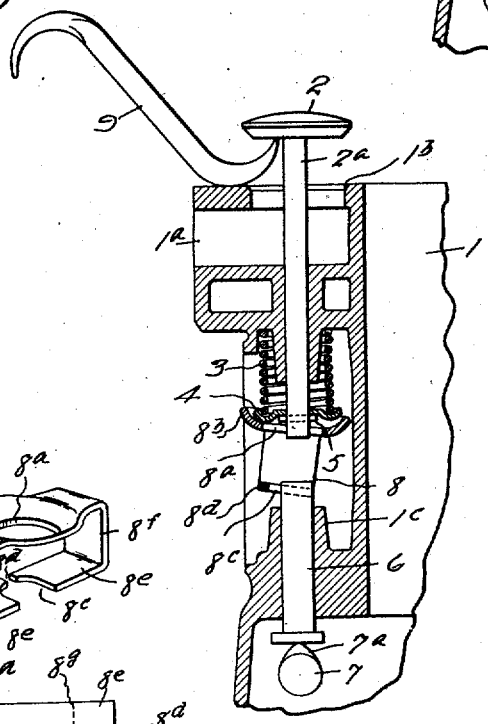

Fig. 2 a similar view illustrating the manner of holding up the valve head and compressing the valve spring, as likewise the manner of inserting the valve spring support for supporting the spring and relieving the valve stem spring seat and valve stem spring seat cotter pin for the detachment of the latter for valve grinding.

Figure 3:
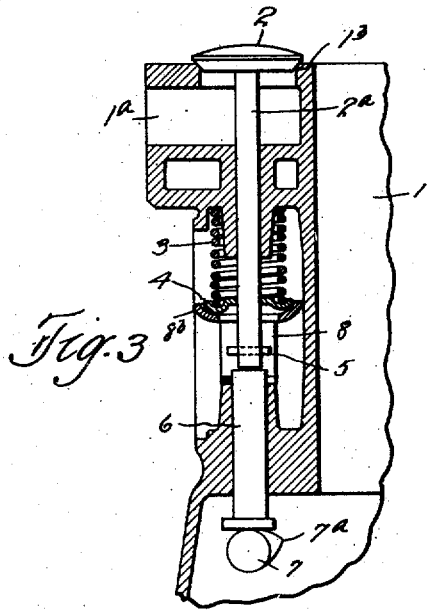

Fig. 3, a similar view with the spring support in seated position for valve grinding in a cylinder or the detachment or removal of the valve for valve grinding by a tool.

Figure 4:
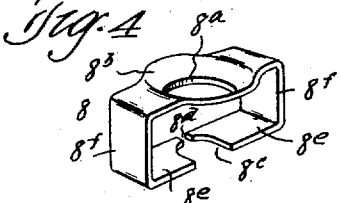

Fig. 4, a perspective view of the improved valve spring support, detached.

Figure 5:
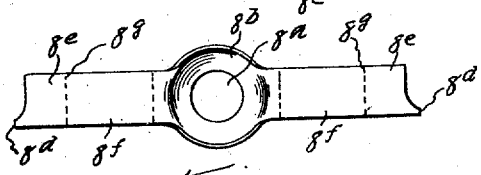

Fig. 5, a top plan view of the blank before being folded and formed up to form a complete support.

Similar numerals of reference designate like parts throughout all the figures of the drawings.

For the purpose of illustrating the application and use of my improved temporary valve spring support in connection with the grinding of an ordinary valve, I have shown a sectional view of the valved portion of an ordinary engine cylinder 1, provided with a valve port $1^a$, having a valve seat $1^b$, said port being controlled by means of an ordinary valve embodying a valve head 2, and a valve stem $2^a$, the valve 2, being held in seated position by means of a valve spring 3 interposed between a stationary part of the cylinder casting and a valve spring seat 4, the latter embodying a disk member provided with an opening loosely receiving the valve stem $2^a$, and connected to the latter as against upward movement against the resistance of the spring by means of a valve spring seat retaining member 5, said retaining member 5, in the present instance, being in the specific form of a cotter pin.

The valve head 2, and valve stem $2^a$, are moved upwardly against the resistance of the spring 3, by means of a push rod 6, slidably mounted in a stationary portion $1^c$, of the cylinder casting and adapted to ride upon and receive its motion from a cam $7^a$, on a cam shaft 7.

Referring now to the improved temporary valve spring support to which this invention particularly relates, it will be seen that I provide a spring support 8, provided at its top with an opening $8^a$, and a surrounding seat portion $8^b$, adapted to initially receive and support the valve stem $2^a$, and valve spring seat 4, respectively, said support being also preferably provided with a base having a guide or centering slot $8^c$ to receive and contain the push rod 6, there being stop portions $8^d$ which limit the inward movement of the base portion and thus centrally position the support as a whole with reference to the push rod and spring.

In order to afford ready access to the valve spring seat retaining member or cotter pin 5, the valve spring support is preferably formed of an upper member and a lower member or base portion, the latter being formed, in the present instance, by means of base end portions $8^e$, connected to side supporting members $8^f$.

As a convenient means of forming the valve support 8, the latter is preferably formed of a single blank of metal as indicated in Fig. 5, of the drawings, and bent upon predetermined lines as indicated by dotted lines $8^g$, the ends of the base end portions being curved as shown in order to provide the guide or centering slot $8^c$ and stops $8^d$ when the said base end portions are brought towards each other and spaced slightly apart.

As a convenient means of inserting the temporary valve spring support, the valve stem $2^a$, and valve 2, together with the push rod 6, are preferably elevated by turning the crank shaft of the engine whereby the valve is opened and the spring compressed to substantially the position indicated in Fig. 1, of the drawings, after which the valve and valve stem may be further elevated by means of a suitable instrument, such as a cotter pulley 9, as indicated in Fig. 2, of the drawings, such elevation of the valve compressing the spring 3, after which the valve spring support may be inserted thereunder, and the guide slot $8^c$ pushed over the upper end of the push rod until the stop portions $8^d$ contact with said rod, and the valve spring seat retaining member 5, or cotter pin, then being relieved of the tension of the spring the valve head and stem may be moved downwardly and the valve seat retaining cotter pin removed for the grinding of the valve either in the engine cylinder, or for its removal for grinding by a separate grinding tool.

Upon the completion of the valve grinding operation, the valve seat retaining member 5, may be returned to its position and the valve may be elevated to substantially the position shown in Fig. 2, after which the valve spring support may be readily removed and the valve head and stem returned in operative engagement with the push rod 6.

Having thus described my invention, what I claim is:

1. A valve spring support comprising a spring receiving frame having a push rod engaging portion for positioning the support with reference to the push rod and spring.

2. A valve spring support comprising a frame for receiving the end of spring, means for supporting said frame, and guiding means connected to said supporting means adapted to engage the push rod and center the support with reference to said spring and rod.

3. A valve spring support comprising a frame having depending legs at the opposite sides thereof, the ends of said legs being turned in opposite directions towards each other and spaced apart to provide a centering guide portion and provided with stop portions.

4. A valve spring support comprising a spring receiving frame, a base portion connected to the frame portion and spaced below the same, said base portion having a central guiding slot adapted to receive the push rod and whereby the support as a whole is centered with reference to the valve spring and push rod.

5 A valve spring support comprising a spring receiving frame and a base portion connected thereto and spaced beneath said frame, said base portion having a central guiding slot adapted to engage a push rod and center the spring receiving frame with reference to said spring, said base portion having stops at the inner end of said central guide slot.

6. A valve spring support provided with openings adapted to initially receive the adjacent ends of the valve spring and push rod, said support having a dished head adapted to receive and interlock with the seat of the valve spring when the latter is compressed by the elevation of the valve stem.

7. A valve spring support, comprising upper and lower spaced members, said upper member being provided with a central opening adapted to receive the valve stem and a surrounding dished head portion conformed to and forming a seat for the valve spring seat of the valve stem, and said lower member being provided with an opening adapted to receive the valve stem push rod.

8. A valve spring support, comprising spaced upper and lower members, said upper member being provided with a central opening adapted to receive the valve stem and cotter pin and provided with a surrounding dished portion to receive and form a seat for the valve spring seat of the valve stem, and said lower member being provided with a guide recess to receive the valve stem push rod and be seated on an adjacent stationary portion.

9. A valve spring support formed of a single blank of sheet metal bent upon itself forming upper and lower members, said upper member being provided with an opening to receive the lower end of the valve stem and the valve spring seat and spring seat pin and provided with a surrounding portion adapted to support the valve spring seat member, said upper member terminating in spaced side members having inwardly extending spaced base ends forming an intermediate pusher rod receiving recess.

10. A valve spring support formed of a single length of sheet metal bent into upper and lower members, said upper member being provided with an opening adapted to receive the lower end of the valve stem and the valve spring seat and spring seat retaining member, said upper member supporting the valve spring seat member and provided with spaced side members terminating in inwardly extending base tongues conjointly forming the lower member and providing an intermediate pusher rod receiving recess.

GLEN W. FLEMING.